(12) United States Patent
Cataniag

(10) Patent No.: US 12,244,763 B2
(45) Date of Patent: Mar. 4, 2025

(54) SYSTEM AND METHOD FOR DISPLAYING CALLED PARTY IDENTIFIERS

(71) Applicant: T-Mobile USA, Inc., Bellevue, WA (US)

(72) Inventor: Arnold Cataniag, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 273 days.

(21) Appl. No.: 17/247,452

(22) Filed: Dec. 11, 2020

(65) Prior Publication Data

US 2022/0191323 A1 Jun. 16, 2022

(51) Int. Cl.
*H04M 3/42* (2006.01)
*H04M 1/2747* (2020.01)
*H04M 1/2748* (2020.01)

(52) U.S. Cl.
CPC ....... *H04M 3/4211* (2013.01); *H04M 1/2747* (2020.01); *H04M 1/2748* (2020.01)

(58) Field of Classification Search
None
See application file for complete search history.

(56) References Cited

U.S. PATENT DOCUMENTS

| | | | | |
|---|---|---|---|---|
| 4,551,581 A * | 11/1985 | Doughty | ........ | H04M 1/57 379/372 |
| 5,608,788 A * | 3/1997 | Demlow | ........ | H04Q 11/0457 379/120 |
| 6,463,143 B2 * | 10/2002 | Bennett, III | ........ | H04M 3/4872 379/207.14 |
| 8,223,939 B2 * | 7/2012 | Schaade | ........ | H04M 3/42042 379/207.15 |
| 8,320,547 B2 * | 11/2012 | Cho | ........ | H04M 1/27457 455/566 |
| 8,515,406 B2 * | 8/2013 | From | ........ | H04M 3/02 379/142.01 |
| 8,626,137 B1 * | 1/2014 | Devitt | ........ | H04W 8/26 455/418 |
| 9,473,625 B1 * | 10/2016 | Messenger | ........ | H04W 24/02 |
| 2002/0141546 A1 * | 10/2002 | Inon | ........ | H04M 3/4931 379/88.01 |
| 2003/0026413 A1 * | 2/2003 | Brandt | ........ | H04M 7/0036 370/352 |
| 2003/0185366 A1 * | 10/2003 | Duncan | ........ | H04M 1/56 379/207.14 |
| 2014/0201002 A1 * | 7/2014 | Nicastro | ........ | G06Q 30/0261 705/14.58 |
| 2017/0279965 A1 * | 9/2017 | Weldon | ........ | H04W 4/16 |

\* cited by examiner

*Primary Examiner* — Quoc D Tran
(74) *Attorney, Agent, or Firm* — Lee & Hayes, P.C.

(57) ABSTRACT

A user equipment configured to receive a user input associated with a phone number is described herein. The phone number may be associated with a party the user is intending to call or message. The user equipment and an associated network may determine a personal identifier, such as an individual or entity name, associated with the phone number regardless of whether or not the phone number is included in a phone book or address book associated with the user. The user equipment may also present or display the personal identifier to the user prior to connecting the call or sending the message.

20 Claims, 6 Drawing Sheets

US 12,244,763 B2

SYSTEM AND METHOD FOR DISPLAYING CALLED PARTY IDENTIFIERS

BACKGROUND

Today, individuals typically rely on address books stored either in remote cloud storage or on the individual's personal devices to remember phone numbers of their acquaintances. In this manner, as long as the acquaintance's personal identifier or name is stored in the individuals address book, the individual may call the acquaintance by selecting or identifying the acquaintance by name. However, if the acquaintance is not stored in the individual's address book, the individual is required to enter the phone number into the calling device. Often times, the individual may misread or mistype the phone number resulting in an erroneous call being placed to a third-party. These erroneous calls result in delays and interruptions for both the calling and called party.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
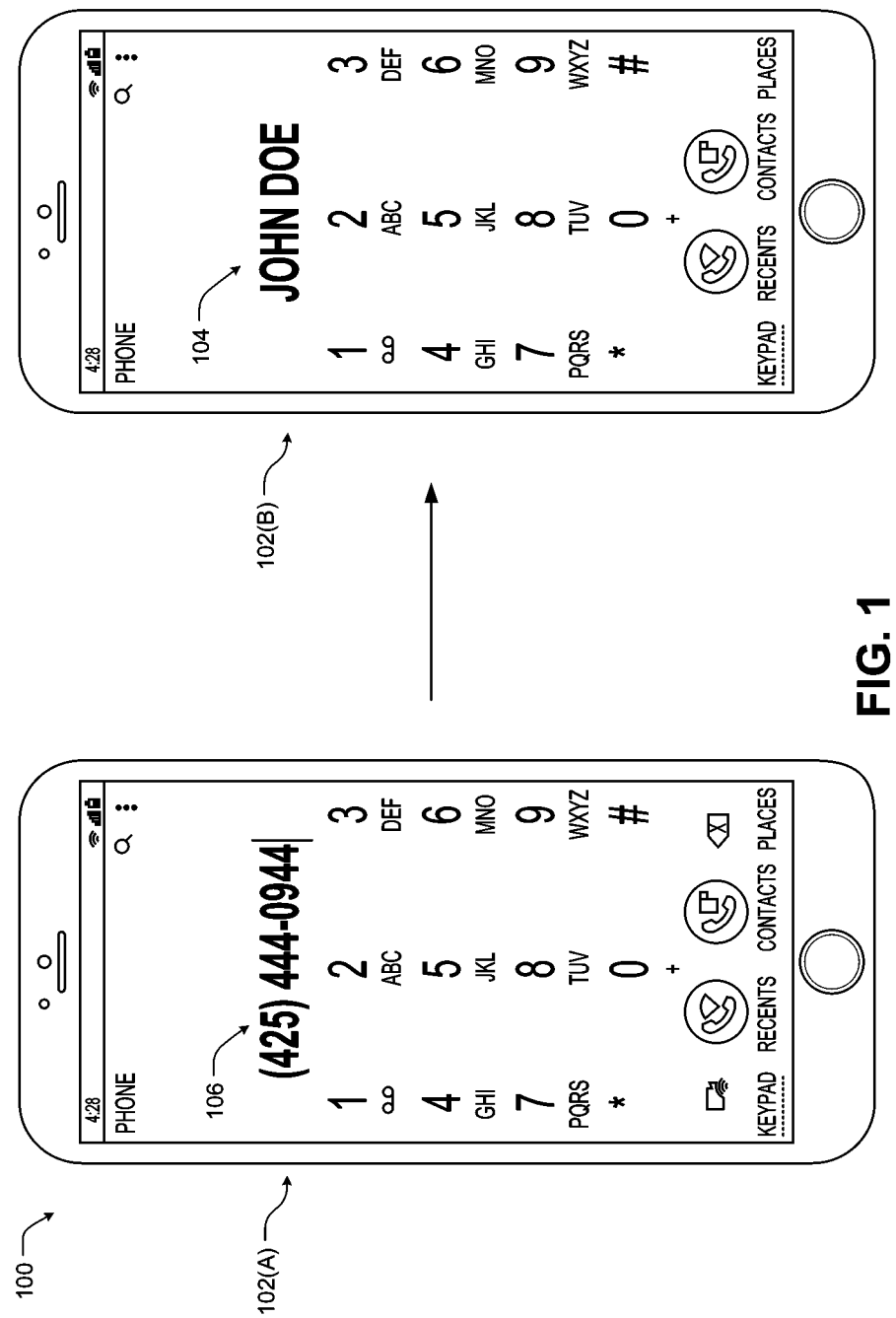
FIG. 1 is an example user equipment displaying user interfaces associated with presenting a called party's personal identifier, in accordance with some examples of the present disclosure.

Discussed herein are systems and methods associated with presenting a calling party with a personal identifier, such as a name of the individual or entity, of the called party. For example, the system discussed herein may retrieve and display a personal identifier associated with a phone number input into a user equipment or device. In some cases, prior to connecting the call, the user equipment may first determine if the phone number is within an address book of the calling party. If the phone number does not match any of the stored numbers in the address book, then the user equipment may send a request to the network to retrieve the called party's personal identifier. In some cases, the network may determine the called party's personal identifier, such as when the number is associated with a user of the network. In other cases, the network may access third-party phone books or databases containing phone number and an associated party. Once obtained, the network returns the called party personal identifier to the requesting user equipment. The user equipment may then replace, on the display, the phone number with the called party's personal identifier. The user equipment may then either wait a predetermined period of time and/or confirmation by the caller (e.g., a user input) prior to connecting or placing the call to the called party.

In some cases, the network may be configured to access particular third-party databases when requesting the called party's personal identifier. For example, the network may request the called party's identifier from another third-party network that is associated with the phone number. In other cases, the network may query an address, phone book, or other online database associated with phone numbers or personal identification information. In some cases, if the particular third-party database is unable to provide the called party's personal identifier, the network may generate a query via one or more publicly available search engines to attempt to identify the called parties personal identifier.

In some cases, the called party's personal identifier may include multiple components. For instance, the called party's personal identifier may include the identity of an entity (such as a corporation, non-profit, organization, family name, and the like) as well as the identity (e.g., name) of an individual associated with the entity. In this example, the user equipment may be configured to display both the identity of the entity and the individual. In other cases, the user equipment may display only one of the identities of the entity or the individual. In still other cases, the user equipment may first display the identity of the entity for a predetermined period of time (such as one or two seconds) and then transition the display to the identity of the individual prior to connection the call or sending the message. In one specific example, the user equipment may cause the identity of the entity and the identity of the individual to rotate at a periodic interval such that the identity of the entity is displayed followed by the identity of the individual and then followed again by the identity of the entity and so forth and so on until the call is connected or the message is sent.

In some implementations, the user equipment may confirm the called party's personal identifier prior to sending text messages, audio messages, data messages, video messages or conferences, in addition to traditional voice calls. In this manner, the calling party may be informed as to the identity of the called party prior to the call being placed. Thus, if the calling party has misread or mistyped the phone number, the calling party may recognize that the called party's personal identifier appears to be incorrect and effectively cancel the call prior to being connected to an erroneous party.

FIG. 1 is an example user equipment 100 displaying user interfaces 102(A) and 102(B) associated with presenting a called party's personal identifier 104, in accordance with some examples of the present disclosure. For instance, as discussed above, the user equipment 100 may be configured to detect the input of a phone number, such as phone number 104. In some examples, the user equipment 100 may first determine if the phone number 104 is a valid entry in a phone book or address book stored either on the user equipment 100 or on an associated cloud-based storage platform. If the phone number 106 matches an entry in the phone book or address book, the user equipment 100 may access and display the called party's personal identifier 104 corresponding to the phone number 106 in the address book prior to connecting a call or sending a message.

In some cases, the phone number 106 may not be present in the phone book or address book. In these cases, the user equipment 100 may then send a request for the called party's personal identifier 104 at or via a network (such as a provider network associated with the user equipment). In one implementation, the user equipment may determine the phone number, a country code, area code, and the like associated with the phone number 106 prior to requesting the called party's personal identifier 102 from the network. In this implementation, the user equipment 100 may indicate to the network the country code, the area code, or other information usable by the network to assist with determining the called party's personal identifier 104.

The network may then return the called party's personal identifier 104. The user equipment 100 may then replace the phone number 106 on the display, as illustrated in interface 102(A), with the called party's personal identifier 104, as illustrated in interface 102(B). By presenting the called party's personal identifier 104, the user equipment 100 may allow the user an opportunity to cancel the call or message prior to connecting with the called party. In this manner, the number of erroneous calls may be reduced and, thereby, reducing network resource consumption associated with erroneous calls.

In some implementations, the user equipment 100 may be coupled or in wired or wireless communication with one or more peripheral or paired devices, such as a smart watch. In these implementations, the user equipment 100 may cause the phone number 106 to be displayed on the peripheral device and transition the phone number 106 on the display of the peripheral device to the called party's personal identifier prior to connecting the call or sending data. In one specific example, the user may enter the phone number and/or confirm the call after the called party's personal identifier is displayed via an input interface associated with the peripheral device.

Figure 2:
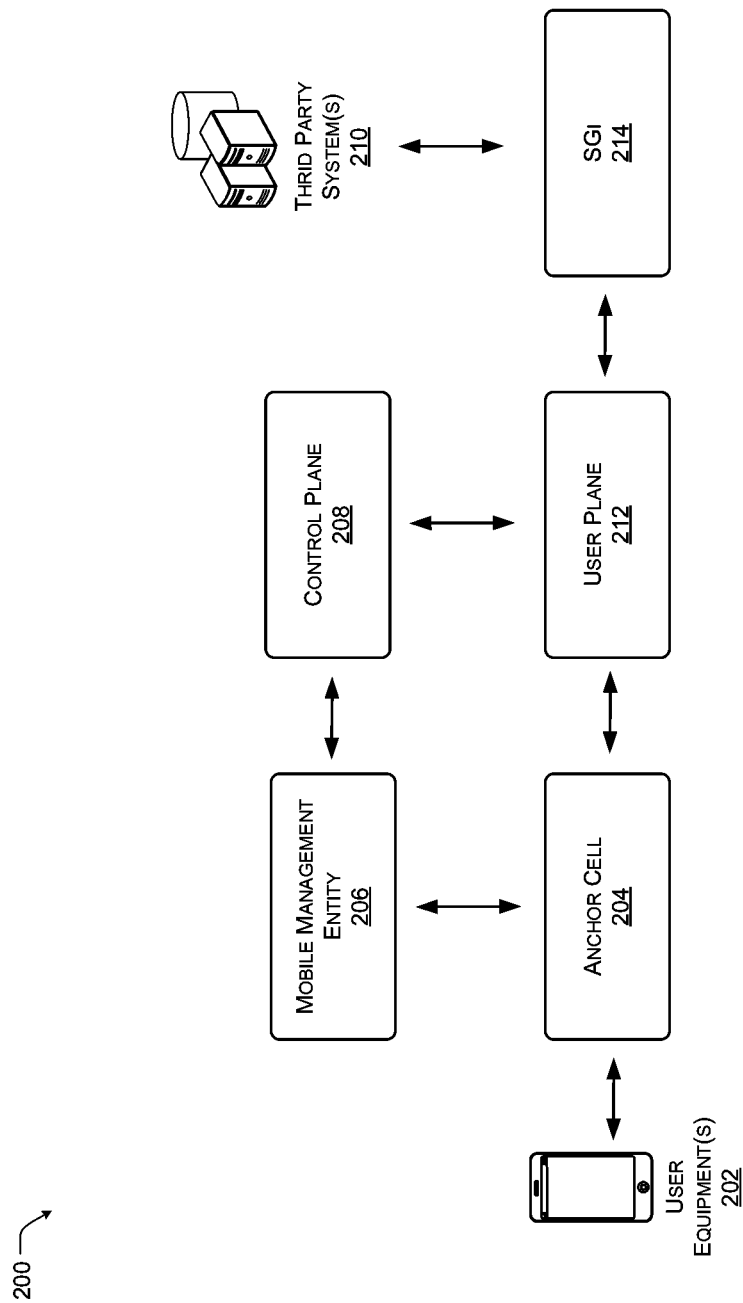
FIG. 2 is an example of a block diagram of a system for presenting a called party's personal identifier to a calling party prior to initiating a connection, in accordance with some examples of the present disclosure.

FIG. 2 is an example of a block diagram of a system 200 for presenting a called party's personal identifier to a calling party prior to initiating a connection, in accordance with some examples of the present disclosure. In the current example, a user (e.g., a calling party) may be attempting to place a call to a called party. The user may enter, via a user interface on associated user equipment 202, a phone number or other identifier associated with the called party. In the current example, the phone number may not be present in the calling party's address book stored either on the user equipment 202 or on a cloud-based storage service.

In this example, the user equipment 202 may provide a request to an anchor node or cell 204. For example, the anchor cell 204 may be a Long-Term Evolution (LTE) Evolved Node B (eNB) cell, an E-Utran New Radio Dual Connectivity (ENDC) cell, G Node B (gNB) cell, and/or the like depending on a frequency used. In some cases, both a control signal or request as well as the data path may be established between the user equipment 202 and the anchor node 204.

The anchor node 204 may process the control signal and/or request via a mobile management entity 206 and/or a control plane 208 (or gateway), as illustrated. The mobile management entity 206 may be in the form of a Mobile Management Entity and/or a Core Access and Mobility Management Function. The control plane 208 may include a serving gateway and/or a session management function. In some cases, the control plane 204 may allow for connectivity and access to a policy server that may be configured to provide data to allow the control plane 208 to confirm or authorize the request for the called party's personal identifier from the user equipment 202. For example, the called party's personal identifier service may be associated with a subscription model and the control plane 204 may confirm the user is subscribed to the service prior to causing a user plane 212 to initiate the search.

The anchor node 204 may also establish a data path with a third-party system 210 via a user plane 212 and a SGi 214 upon authorization by the control plane 208. For example, the user plane 212 may send a query for the called party's personal identifier to one or more third-party systems 210 via the SGi 214 upon the authorization by the control plane 208. If the called party's personal identifier is located, then the called party's personal identifier may be provided back to the user equipment 202 over the data path between the anchor cell 204, the user plane 212, and the SGi 214.

Once the called party's personal identifier is received at the user equipment 202, the user equipment 202 may replace the phone number input by the calling party with the called party's personal identifier on the display or output interface. In some cases, the user (e.g., the calling party) may, at a time after the called party's personal identifier is displayed, provide an additional user input to place or connect the call with the called party, having confirmed the phone number is associated with an intended called party. In other cases, the user equipment 202 may wait a predetermined period of time (e.g., one second, two seconds, three seconds, five seconds, and the like) prior to placing or connecting the call. The period of time may allow the user (e.g., calling party) to cancel the call, in case the phone number is not associated with the intended called party.

Figure 3:
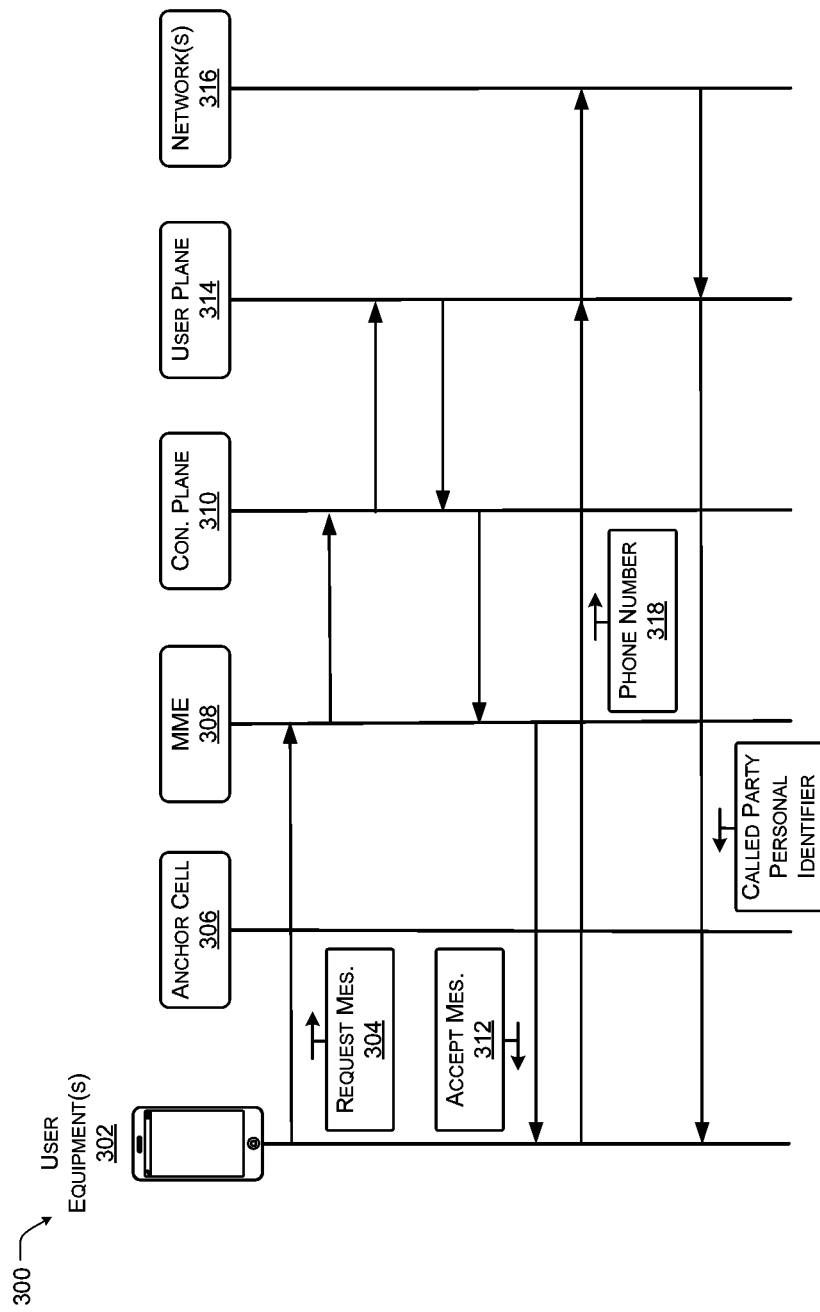
FIG. 3 is an example of a signal diagram of a system for presenting a called party's personal identifier to a calling party prior to initiating a connection, in accordance with some examples of the present disclosure.

FIG. 3 is an example of a signal diagram of a system 300 for presenting a called party's personal identifier to a calling party prior to initiating a connection, in accordance with some examples of the present disclosure. In the current example, a user (e.g., the calling party) may attempt to initiate a call, text message, data transfer, or the like with a called party by inputting a phone number into the user equipment 302. In some implementations, the user equipment 302 may detect the input of the phone number 318, for instance, based on a currently active application on the user equipment, a number or arrangement of characters input, the type of characters input (e.g., all numeric), and the like.

Upon detection of the phone number, the user equipment 302 may initiate a request message 304 associated with obtaining or retrieving a called party's personal identifier from the network. The request message 304 may be received at an anchor cell 306 and/or a Mobile Management Entity 308. The request message 304 may then be processed by a control plane 310. For example, the control plane 310 may confirm the called party is authorized to initiate called party identifier requests. An accept message 312 may then be sent back to the user equipment 302 and an authorization may then be forwarded to the user plane 314. The user plane 314 may establish a data connection between the user equipment 302 and one or more networks 316 (such as the internet).

The user equipment 302 may then send the phone number 318 over the data connection to the networks 316 to cause a search for the called party's personal identifier 320. The network 316 may then return, over the data connection, the called party personal identifier 320. For instance, the called party's personal identifier 320 may include the identity of an entity (such as a corporation, non-profit, organization, family name, and the like) as well as the identity (e.g., name) of an individual associated with the entity. In some cases, the user equipment 302 may be configured to display both the identity of the entity and the individual. In other cases, the user equipment 302 may display only one of the identity of the entity or the individual. In still other cases, the user equipment 302 may first display the identity of the entity for a predetermined period of time (such as one or two seconds) and then transition the display to the identity of the individual prior to connection the call or sending the message. In one specific example, the user equipment 302 may cause the identity of the entity and the identity of the individual to rotate at a periodic interval such that the identity of the entity is displayed followed by the identity of the individual and then followed again by the identity of the entity and so forth and so on until the call is connected or the message is sent.

In some cases, the user equipment 302 may previously be registered with the network 316. For instance, the user may be dialing or otherwise initiating communication with a second called party using the user equipment 302. In these situation, the user equipment 302 may provide the phone number 318 to and receive the called party personal identifier 320 from the network 302 without sending a request message 304 to and receiving an accept message 312 from the user plane 314, as illustrated in the current example.

Figure 4:
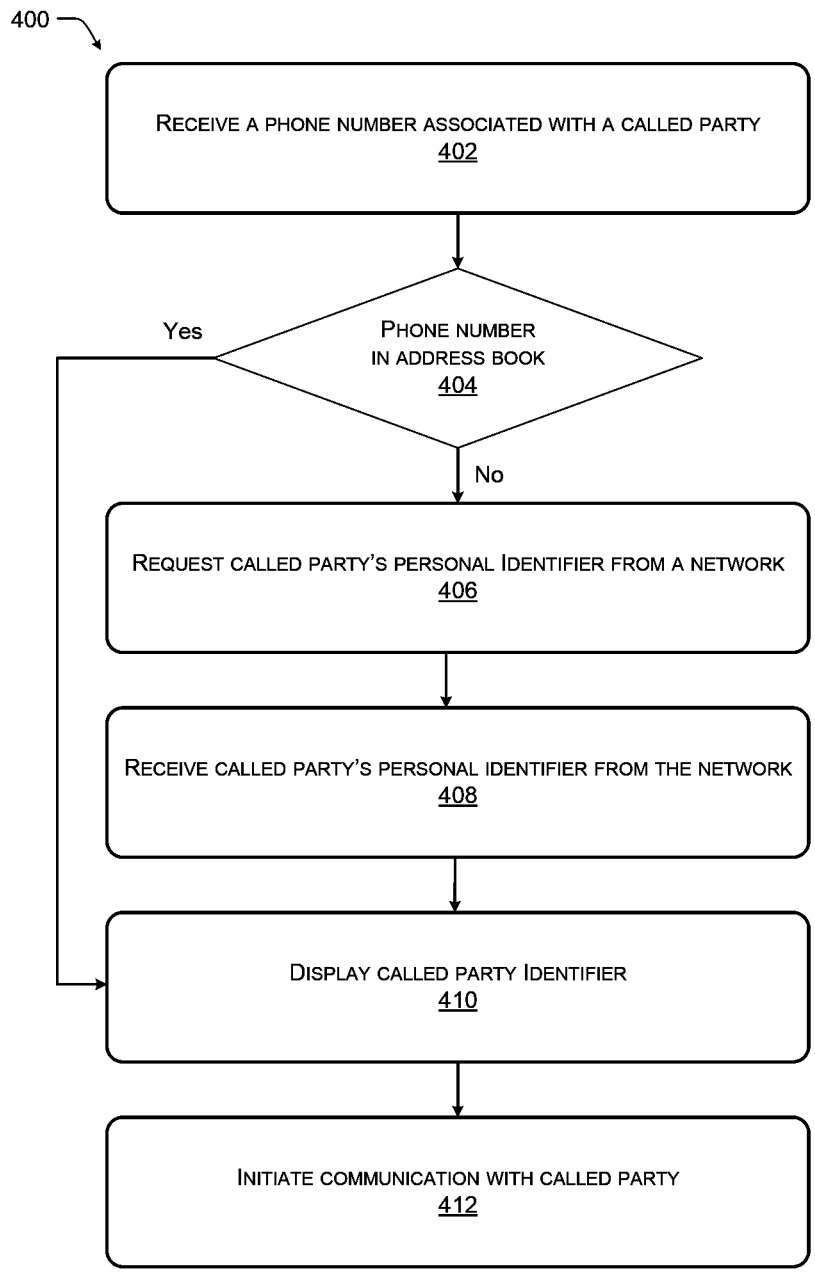
FIG. 4 illustrates an example flow diagram showing an illustrative process associated with presenting a called party's personal identifier to a calling party prior to initiating a connection, in accordance with some examples of the present disclosure.
Figure 5:
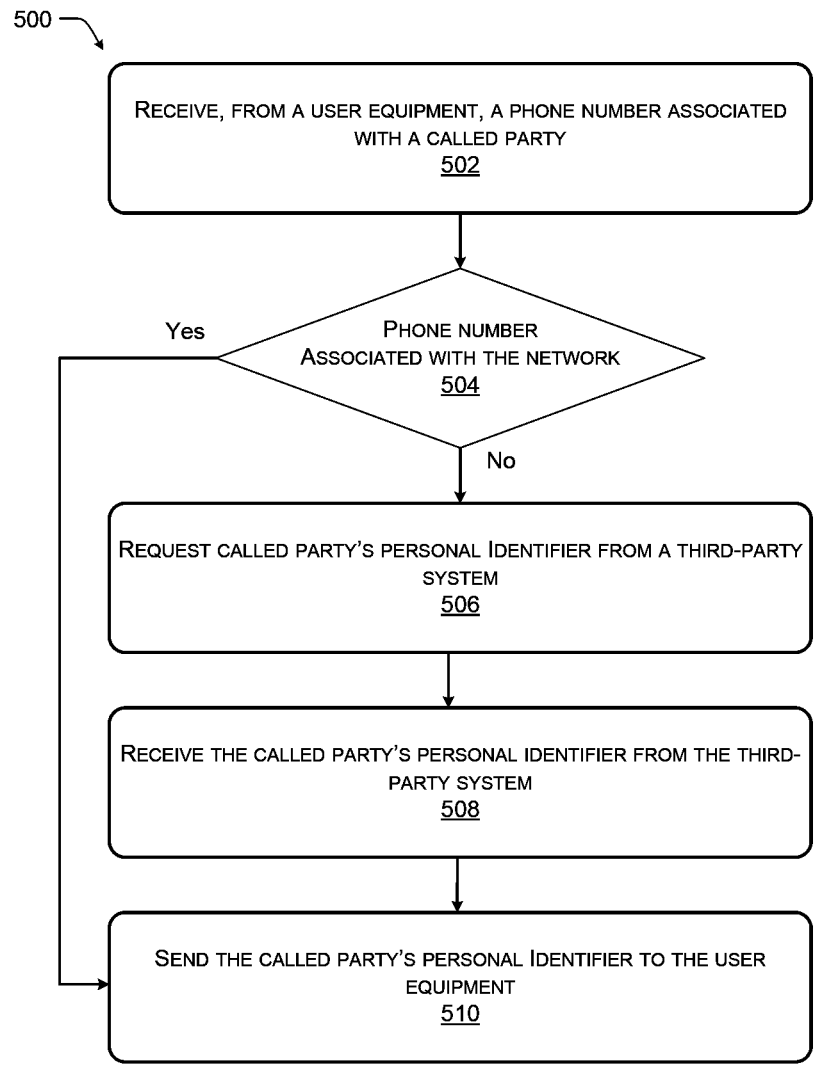
FIG. 5 illustrates an example flow diagram showing an illustrative process associated with presenting a called party's personal identifier to a calling party prior to initiating a connection, in accordance with some examples of the present disclosure.

FIGS. 4 and 5 are flow diagrams illustrating example processes associated with the routing agents with presenting a called party's personal identifier to a calling party prior to initiating a connection according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 4 illustrates an example flow diagram showing an illustrative process 400 associated with presenting a called party's personal identifier to a calling party prior to initiating a connection, in accordance with some examples of the present disclosure. For instance, as discussed above, a user may enter, type, or otherwise input a phone number associated with a called party into a user equipment in order to initiate a call, text message, data transfer, or the like with the called party. However, in some instances, the phone number may be entered incorrectly resulting in an erroneous call, text message, or data transfer that results in increased network resource usage, wasted time, and/or sharing of data with unauthorized parties. In these cases, the process 400 discussed below assists with reducing the number of erroneous connections.

At 402, a user equipment may receive a phone number associated with a called party. For instance, a user may input the phone number into the user equipment via one or more user interfaces, such as a touch screen display. The phone number may in some cases be input into an application hosted by the user equipment, such as a phone application, a text message application, and/or a data transfer application. In the various examples and applications, the user equipment may detect the input of and/or extract the phone number.

At 404, the user equipment may determine if the phone number is in an address book associated with the user. For example, the address book or phone book may be stored locally on the user equipment and/or in the cloud via a cloud-based storage service. The user equipment may query the local storage and/or the cloud-based storage service to determine if the phone number is known. If the phone number is in the address book and a called party's personal identifier returned, the process 400 may advance to 410. At 410, the user equipment may display the called party's personal identifier on a display or output interface. Otherwise, if the phone number is not in the address book or the called party's personal identifier returned, the process 400 may proceed to 406.

At 406, the user equipment may request the called party's personal identifier from a network. In some cases, the network may be a network associated with a mobile service provider at which the user has an activate account. The request may include the phone number and be routed via the network as discussed above with respect to FIGS. 2 and 3.

At 408, the user equipment may receive the called party's personal identifier from the network. In some cases, the called party's personal identifier may be returned over a data connection established by the network and between the user equipment and a third-party network (such as a cloud-based white pages service). In other cases, the called party's personal identifier may be returned directly by the network associated with the mobile service provider.

At 410, the user equipment may display the called party's personal identifier on a display or output interface, as discussed above. For instance, the user equipment may replace the phone number with the called party's personal identifier. The user equipment may then either wait a predetermined period of time and/or receive confirmation by the caller (e.g., a user input). Once the period of time has elapsed and/or the confirmation is received from the user, the process 400 may advance to 412, and the user equipment may initiate the communication with the called party.

FIG. 5 illustrates an example flow diagram showing an illustrative process 500 associated with presenting a called party's personal identifier to a calling party prior to initiating a connection, in accordance with some examples of the present disclosure. In various instances, a user equipment may request from a network (such as the mobile provider network associated with the user of the user equipment) to provide a called party's personal identifier. The called party's personal identifier may then be displayed to the calling party via the user equipment prior to the network establishing the communication connection on behalf of the user and/or the user equipment.

At 502, the network may receive, from a user equipment, a phone number associated with a called party. In some cases, the user equipment may supply the phone number in response to detecting a specific number of characters or types of characters input into the user equipment. In some cases, the user equipment may also provide country codes and the like to assist the network in determining the called party's personal identifier.

At 504, the network may determine if the phone number is associated with the network. For instance, the network may determine if the phone number is related to a user or user account of the mobile service provider associated with the network. If the phone number is associated with a user or user account of the network, the network may retrieve the called party's personal identifier from an associated data store and the process 500 may advance to 510. Otherwise, the process 500 may continue to 506.

At 506, the network may request the called party's personal identifier from a third-party system. For instance, the network may generate, or allow the user equipment to generate, a search query via one or more search engine and/or phone number databases (such as white pages type services).

At 508, the network may receive the called party's personal identifier from the third-party system. For example, the search query may return the called party's personal identifier. The called party's personal identifier may include the identity of an entity (such as a corporation, non-profit, organization, family name, and the like) as well as the identity (e.g., name) of an individual associated with the entity, as discussed above.

At 510, the network may send the called party's personal identifier to the user equipment. For example, the network may allow or enable the third-party network to establish a data connection with the user equipment, such that the called party's personal identifier may be transmitted to and/or received by the user equipment.

Figure 6:
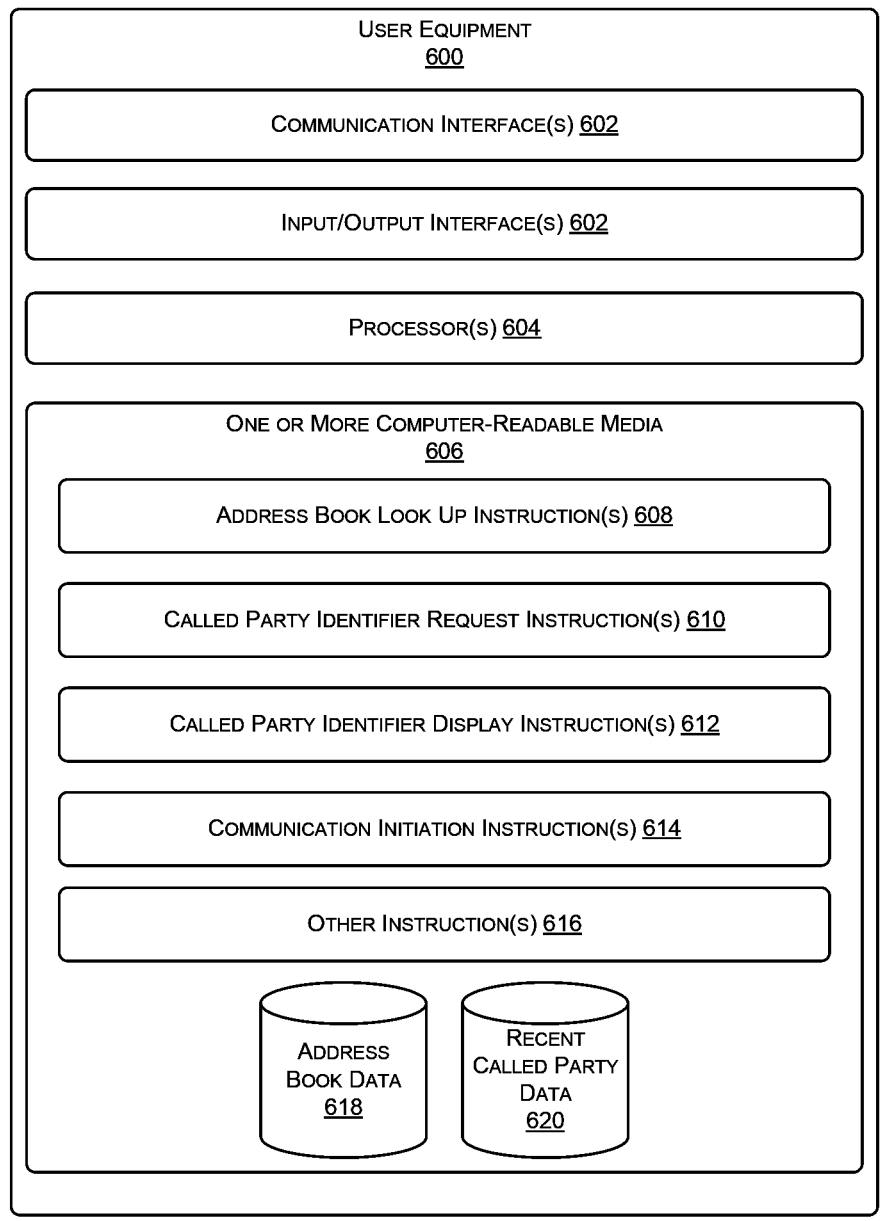
FIG. 6 illustrates an example hardware associated with the user equipment of FIGS. 1-5, in accordance with some examples of the present disclosure.

FIG. 6 illustrates an example hardware associated with the user equipment 600 of FIGS. 1-5, in accordance with some examples of the present disclosure. For instance, as discussed above, a user may enter, type, or otherwise input a phone number associated with a called party into a user equipment in order to initiate a call, text message, data transfer, or the like with the called party. However, in some instances, the phone number may be entered incorrectly resulting in an erroneous call, text message, or data transfer that results in increased network resource usage, wasted time, and/or sharing of data with unauthorized parties.

In some implementations, the user equipment 600 may include one or more communication interfaces 602 configured to facilitate communication between one or more networks (e.g., a mobile service provider network), one or more cloud-based systems (such as, third-party networks 210 or 316), and/or one or more other devices. The communication interfaces 602 may support both wired and wireless connections to various networks, such as cellular networks, radio, WiFi networks, infrared signals, local area networks, wide area networks, the Internet, and so forth. In some cases, the communication interfaces 602 may be configured to receive transactions and/or data packets from user equipment or client devices as well as servers and share load data with other routing agents.

The processor(s) 604 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. Additionally, each of the processor(s) 504 may possess its own local memory, which also can store program modules, program data, and/or one or more operating systems.

Depending on the exact configuration and type of the user equipment 600, the computer-readable media 606, may include computer storage media and/or communication media. Computer storage media 606 can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media 606 can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 606 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information. Any such non-transitory computer-readable media can be part of the user equipment 600.

The computer-readable media 606 can include one or more modules and data structures including, for example, address book look up instructions 608, called party identifier request instructions 610, called party identifier display instructions 612, communication initiation instructions 614, as well as other instructions 616, such as an operating system. The one or more modules, instruction sets, and data structures can be in the form of stand-alone applications, productivity applications, an operating system component, or any other application or software module configured to perform operations as described herein. The computer-readable media 606 may also store data, such as address book data 618 and recent called party data 620.

The address book look up instructions 608 may be configured to determine if the phone number is present on a local storage of the user equipment 600, such as within the address book data 618 and/or the recent called party data 620. For example, in addition to the address book data 618, the user equipment 600 may maintain data, such as called party personal identifiers, associated with recent compunctions. In some cases, the recent called party data 620 may be maintained for a predetermined number of communications (such as 5, 10, 15, 25, etc.) to reduce the number of called party personal identifier requests made by the user equipment 600 to the network.

The called party identifier request instructions 610 may be configured to send the request message and the phone number to the network when the phone number is not stored within the address book data 618 and/or the recent called party data 620. In some cases, the called party identifier request instructions 610 may also assist with receiving the called party's personal identifier from the network, third-party networks, or the like and storing the called party's personal identifier with respect to the recent called party data 620.

The called party identifier display instructions 612 may be configured to cause the phone number to transition to the called party's personal identifier. In some cases, the called party identifier display instructions 612 may assist with selecting what portion of the called party's personal identifier is displayed (e.g., selecting between multiple names, individuals and entities, and the like). The called party identifier display instructions 612 may also cause the display to transition back and forth between multiple portions of the called party identifier display instructions 612 (e.g., between an entity name and an individual name).

The communication initiation instructions 614 may be configured to cause the communication (e.g., the call, text message, data transfer, and the like) to be connected or otherwise processed. For example, once the called party identifier display instructions 612 displays the called party's personal identifier, the communication initiation instructions 614 may wait a predetermined period of time prior to authorizing or initiating the communication. In other implementations, communication initiation instructions 614 may authorize or initiate the communication in response to receiving an additional user input following the display of the called party's personal identifier.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   detecting, at an interface of a user equipment, an input of a phone number associated with a called party;
   sending a request to a network to identify a personal identifier associated with the called party;
   receiving, via the network, the personal identifier;
   causing the personal identifier to be displayed via the interface of the user equipment;
   initiating, in response to the user equipment displaying the personal identifier, a timer;
   determining, based at least in part on the timer, that a period of time has elapsed; and
   responsive to the period of time elapsing, initiating a communication over the network with the called party.

2. The computer-implemented method as claim 1 recites, further comprising determining that the phone number is not present in an address book prior to sending the request to the network.

3. The computer-implemented method as claim 1 recites, wherein the personal identifier includes an entity name and an individual name.

4. The computer-implemented method as claim 3 recites, wherein:
   causing the personal identifier to be displayed via the interface of the user equipment further comprises displaying the entity name for a first period of time and the individual name for a second period of time, the first period of time different than the second period of time.

5. The computer-implemented method as claim 3 recites, wherein:
   causing the personal identifier to be displayed via the interface of the user equipment further comprises selecting the individual name and displaying the individual name on the interface of the user equipment.

6. A system comprising:
   one or more communication interfaces;
   one or more processors;
   non-transitory computer-readable media storing computer-executable instructions, which when executed by the one or more processors cause the one or more processors to perform operations including:
   receiving from a user equipment a request to initiate a communication with a called party;
   requesting from a third-party network a personal identifier associated with the called party;
   receiving from, the third-party network the personal identifier;
   sending the personal identifier to the user equipment;
   causing the personal identifier to be displayed via an interface of the user equipment;
   initiating, in response to the user equipment displaying the personal identifier, a timer;
   determining, based at least in part on the timer, a period of time associated with the sending the personal identifier to the user equipment has elapsed; and
   responsive to the period of time elapsing, initiating the communication between the user equipment and the called party.

7. The system as recited in claim 6, wherein the request includes a phone number associated with the called party.

8. The system as recited in claim 7, wherein the non-transitory computer-readable media stores additional computer-executable instructions, which when executed by the one or more processors cause the one or more processors to perform operations including:
   determining that the phone number is not associated with a user account of the system prior to sending the request to the third-party network to identify the personal identifier associated with the called party.

9. The system as recited in claim 6, wherein the request to initiate the communication with the called party includes a request to obtain the personal identifier.

10. The system as recited in claim 9, wherein the non-transitory computer-readable media stores additional computer-executable instructions, which when executed by the one or more processors cause the one or more processors to perform operations including determining that an account associated with the user equipment is authorized to request the personal identifier.

11. The system as recited in claim 6, wherein the personal identifier includes an entity name and an individual name.

12. A method comprising:
    detecting, at an interface of a user equipment, an input of a phone number associated with a called party;
    sending a request to a network to identify a personal identifier associated with the called party;
    receiving, via the network, the personal identifier;
    causing the personal identifier to be displayed via the interface of the user equipment;

initiating, in response to the user equipment displaying the personal identifier, a timer;

determining, based at least in part on the timer, that a period of time has elapsed; and responsive to the period of time elapsing, initiating a communication over the network with the called party.

13. The method as claim 12 recites, wherein the personal identifier includes an entity name and an individual name.

14. The method as claim 13 recites, wherein causing the personal identifier to be displayed via the interface of the user equipment further comprises selecting the individual name and displaying the individual name on the interface of the user equipment.

15. The method as claim 13 recites, wherein causing the personal identifier to be displayed via the interface of the user equipment further comprises displaying the entity name for a first period of time and the individual name for a second period of time, the first period of time different than the second period of time.

16. The computer-implemented method as claim 1 recites, wherein the personal identifier includes an entity name and an individual name, the method further comprising:

causing the entity name to be displayed via the interface of the user equipment; and subsequently, causing the entity name to be displayed via the interface of the user equipment.

17. The computer-implemented method as claim 1 recites, wherein the personal identifier includes an entity name and an individual name, the method further comprising causing the entity name and the individual name to be displayed in rotation at a periodic interval such that the entity name is displayed followed by the individual name.

18. The computer-implemented method as claim 1 recites, further comprising causing, during the period of time, display of an option to cancel the communication.

19. The computer-implemented method as claim 18 recites, further comprising responsive to the period of time elapsing and in response to not receiving selection of the option to cancel during the period of time, initiating the communication over the network with the called party.

20. The computer-implemented method as claim 1 recites, wherein the period of time comprises between one and five seconds.

* * * * *